Jan. 13, 1931. P. O. ROCKWELL 1,789,194
PROCESS AND APPARATUS FOR PURIFYING AIR
Filed March 20, 1925
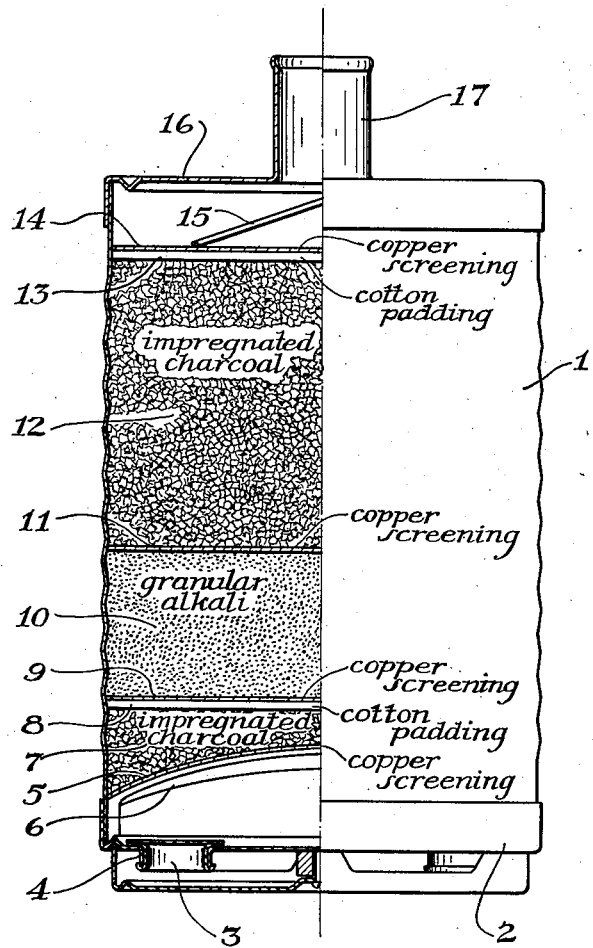
Inventor.
Paul O. Rockwell
By Chas. Silver
Attorney.

Patented Jan. 13, 1931

1,789,194

UNITED STATES PATENT OFFICE

PAUL O. ROCKWELL, OF EDGEWOOD ARSENAL, MARYLAND

PROCESS AND APPARATUS FOR PURIFYING AIR

Application filed March 20, 1925. Serial No. 16,964.

(GRANTED UNDER THE ACT OF MARCH 3, 1883, AS AMENDED APRIL 30, 1928; 370 O. G. 757.)

This invention described herein may be manufactured and used by or for the Government for Government purposes, without the payment to me of any royalty thereon.

This invention relates to a method and apparatus for purifying air contaminated and vitiated with toxic gases, more particularly cyanogen chloride, with or without other toxic gases such as hydrocyanic acid.

Among the objects of this invention is the provision of a process and apparatus for protection of man or animal against the toxic influence of polluted air containing toxic gases such as cyanogen chloride and mixtures of cyanogen chloride and other toxic gases.

Another object of this invention is to provide a method and apparatus whereby air which has been polluted or contaminated with toxic gases of this character will be purified and rendered suitable for breathing by man or animal and without producing toxic effects.

A further object of this invention is to provide a method and apparatus for withdrawing cyanogen chloride and other gases admixed therewith, such as hydrocyanic acid, from air in an efficient and comparatively inexpensive manner resulting in complete removal of the toxic gases from the air.

A still further object of this invention is to provide a process and apparatus for use by persons engaged in fumigating ships, buildings, vegetation or other places with cyanogen chloride and mixtures of cyanogen chloride and other toxic gases such as hydrocyanic acid.

Other, further and more specific objects of the invention will become readily apparent to persons skilled in the art from a consideration of the following description when taken in conjunction with the accompanying drawing, wherein I have shown an apparatus employing charcoal impregnated with hexamethylenetetramine and constituting a specific embodiment of my invention, and comprising a canister shown partly in elevation and partly in section.

This canister comprises a waterproof casing (1), preferably made of sheet metal, but it is to be understood that other waterproof materials such as impregnated paper or fibre can be used under varying conditions, and a close fitting bottom cover (2), said bottom having perforations for receiving check valves (3). These check valves are preferably made of rubber, and in order to insure a proper seating of these valves, there are provided the sleeves (4) upon the bottom (2). Inside of the casing (1) and above the valves (3) is a screen (5), preferably 20 mesh copper screening, and is held in position by a suitable support (6). Above this screen there is placed a quantity of activated carbon or charcoal (7) impregnated with hexamethylenetetramine and preferably in the form of coarse granules and above this impregnated charcoal (7) is a cotton pad (8) and screen (9) upon which is placed a layer of granular alkali material such as caustic pumice granules (10). Upon this pumice is a screen (11) on which is another layer of activated carbon (12) impregnated with hexamethylenetetramine and on this impregnated carbon (12) is a cotton pad (13) and a screen (14). The screens (11) and (14) are preferably made of the same material as screen (5).

The materials in the canister are kept pressed against each other and in position by means of a spring (15) bearing against the screen (14) and the top (16) of the canister.

This canister is employed by attaching the outlet nozzle (17) to a hose or other suitable conduit leading to a gas mask. The air to be purified is drawn in thru the valve (3) and passes thru the activated charcoal (7) impregnated with hexamethylenetetramine or other alkali, which removes part of the cyanogen chloride and hydrocyanic acid contained therein. On passing thru the caustic pumice (1), moisture, hydrocyanic acid and a part of the cyanogen chloride in the air are taken up by the caustic pumice and the air freed thereof, and as this air is drawn thru the activated charcoal (12) impregnated with hexamethylenetetramine or other alkali, the remainder of the cyanogen chloride will be taken out and the air passing thru the nozzle (17) to the gas mask will be free from the poisonous and toxic gases with which the air was vitiated when drawn into the canister.

The impregnated activated carbon (7) and (12) is prepared by treating activated charcoal or carbon with a 1 to 5% aqueous solution of hexamethylenetetramine. The charcoal is then dried at ordinary temperature (15–30° C.). This drying may be accomplished by first partially drying the charcoal by exposure to air for about a day and then completing the drying by blowing dry air thru the material.

Instead of charcoal impregnated with hexamethylenetetramine, I may substitute the fixed alkalies such as NaOH, KOH or other basic compounds such as $Na_2S$, $Na_2CO_3$ and the hydrated oxides of calcium, barium and iron. These alternative compounds are also to be used in dry form.

The granular alkali may be such material as will actively absorb moisture or acid vapors. I prefer to use a material which will absorb both moisture and acid vapors. I have found caustic pumice granules very desirable for this purpose, although iron gel, aluminum gel or granular caustic alkali could also be used.

Granular alkali materials have a very high capacity for absorption of acid gases. Hydrocyanic acid or hydrochloric acid vapors, chlorine, etc. are completely absorbed, even when passed through the material at a high velocity. If caustic pumice is employed for this purpose it may be prepared by soaking pumice granules in an aqueous solution of NaOH or KOH, then draining the granules holding the alkali solution and subsequently drying. I prefer to use pumice granules of 30 mesh or larger, and to add same gradually to the alkali solution heated to approximately 100–150° C. It is desirable to stir the mixture while the pumice is being incorporated.

Instead of using caustic pumice granules as the moisture and vapor absorbent, the air undergoing treatment may be passed through an absorbent for acid vapors, such as soda lime or absorbent charcoal and also through a dehydrating agent or moisture absorbent, such as granular calcium chloride or silica gel, in order to free the air from the moisture and acid vapors.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of purifying air, withdrawing moisture and acid vapors from said air and then passing said air through dry granular material impregnated with hexamethylenetetramine.

2. In a process of purifying air, passing said air through granular alkali material and then through substantially dry, granular, activated characoal impregnated with hexamethylenetetramine.

3. In a process of treating air vitiated with toxic gases including cyanogen chloride, withdrawing moisture and acid vapors from said air and then passing said air through granular, activated charcoal impregnated with hexamethylenetetramine.

4. In a process of treating air vitiated with toxic gases including cyanogen chloride and hydrocyanic acid, passing said air through granular alkali material and then through substantially dry, granular, activated charcoal impregnated with hexamethylenetetramine.

5. In a process of treating air vitiated with toxic gases including cyanogen chloride, passing said air through granular material impregnated with hexamethylenetetramine, then through granular absorbents for moisture and acid vapors and then through substantially dry, granular material impregnated with hexamethylenetetramine.

6. In an apparatus for treating gases containing toxic and irritating gaseous substances, a canister having in the path for gas passing therethrough granular material for removing moisture and acid vapors and substantially dry granular material impregnated with hexamethylenetetramine.

7. In an apparatus for treating gases containing toxic and irritating gaseous substances, a canister having in the path for gas passing therethrough granular alkali material and substantially dry, granular, activated carbon impregnated with hexamethylenetetramine.

8. In an apparatus for treating gases containing toxic and irritating gaseous substances, a canister having in the path for gas gassing therethrough a layer of granular activated carbon impregnated with hexamethylenetetramine, a layer of granular alkali material and another layer of substantially dry granular activated charcoal impregnated with hexamethylenetetramine.

PAUL O. ROCKWELL.